(12) United States Patent
Kang

(10) Patent No.: US 11,136,039 B2
(45) Date of Patent: Oct. 5, 2021

(54) APPARATUS AND METHOD FOR CONTROLLING RUNNING OF VEHICLE

(71) Applicants: HYUNDAI MOTOR COMPANY, Seoul (KR); KIA MOTORS CORPORATION, Seoul (KR)

(72) Inventor: Dong Hoon Kang, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 268 days.

(21) Appl. No.: 16/425,218

(22) Filed: May 29, 2019

(65) Prior Publication Data

US 2020/0189596 A1 Jun. 18, 2020

(30) Foreign Application Priority Data

Dec. 12, 2018 (KR) ........................ 10-2018-0159781

(51) Int. Cl.
  *B60W 30/18* (2012.01)
  *G05D 1/00* (2006.01)
  (Continued)

(52) U.S. Cl.
  CPC ...... *B60W 30/18163* (2013.01); *B60W 10/04* (2013.01); *B60W 30/16* (2013.01);
  (Continued)

(58) Field of Classification Search
  None
  See application file for complete search history.

(56) References Cited

U.S. PATENT DOCUMENTS 10,089,876 B1 * 10/2018 Ramasamy ............ G08G 1/167
2014/0195093 A1 * 7/2014 Litkouhi ................ B60W 30/16
  701/23

(Continued)

FOREIGN PATENT DOCUMENTS

JP   2016-147556 A   8/2016
JP   2018-039318 A   3/2018
KR   10-2017-0035808 A   3/2017

OTHER PUBLICATIONS

Kim et al., "Flexible Distance Maintenance of Autonomous vehicle in Accordance with Lane Change of Lateral Position Vehicle", Nov. 12-15, 2014, The 11th International Conference on Ubiquitous Robots and Ambient Intelligence (URAI 2014), p. 316-320 (Year: 2014).*

*Primary Examiner* — Tamara L Weber

(57) ABSTRACT

A vehicle running control method includes: acquiring, at least one of a first traveling state information of an autonomous vehicle and a second traveling state information of adjacent vehicles traveling in a traveling lane or in a lane adjacent to the traveling lane through a sensor unit; determining, by a determination processor, a candidate cut-in vehicle that travels behind the autonomous vehicle among the adjacent vehicles based on the first and second traveling state information; searching, by a controller, for a potential cut-in space, which is determined based on the relative velocity of a preceding vehicle that is the closest to the autonomous vehicle among the adjacent vehicles and the distance between the preceding vehicle and the autonomous vehicle; and performing, by the controller, deceleration, acceleration, or velocity maintenance of the autonomous vehicle depending on whether the potential cut-in space is present.

16 Claims, 5 Drawing Sheets

(51) Int. Cl.
  *B60W 10/04* (2006.01)
  *B60W 30/16* (2020.01)
(52) U.S. Cl.
  CPC ....... *G05D 1/0088* (2013.01); *B60W 2552/00* (2020.02); *B60W 2554/4041* (2020.02); *B60W 2554/804* (2020.02); *B60W 2720/106* (2013.01); *G05D 2201/0213* (2013.01)

(56) References Cited

U.S. PATENT DOCUMENTS

2018/0032082 A1* 2/2018 Shalev-Shwartz ..... G06N 7/005
2020/0122773 A1* 4/2020 Deshpande ............. G01S 13/89

\* cited by examiner

APPARATUS AND METHOD FOR CONTROLLING RUNNING OF VEHICLE

CROSS-REFERENCE TO RELATED APPLICATION

This application claims priority to and the benefit of Korean Patent Application No. 10-2018-0159781, filed on Dec. 12, 2018, the entire contents of which are incorporated herein by reference.

FIELD

The present disclosure relates to an apparatus and method for controlling the running of an autonomous vehicle.

BACKGROUND

The statements in this section merely provide background information related to the present disclosure and may not constitute prior art.

General lane changing technology is merely configured such that, when a driver shows his/her intention to change lanes (for example, when the driver turns on a turn signal lamp), it is determined whether it is possible to change lanes within a predetermined time, and the lane change is performed upon determining that it is possible to change lanes.

Additionally, in most research on autonomous traveling, the lane change is performed only when it is possible to change lanes, for example, when a path that makes it possible to avoid a collision is generated. Furthermore, level-4 autonomous traveling must be designed such that traveling is possible from the current position to a destination without the intervention of a driver under limited operational design domain (ODD) conditions, unlike level-2 autonomous traveling (ADAS system). Therefore, general lane-changing technology has difficulty satisfying the requirements of the level-4 autonomous traveling.

Particularly, in various situations, such as the case in which there is a vehicle that travels in a lane adjacent to the lane in which a general autonomous vehicle travels and speeds up behind the autonomous vehicle in order to cut into the traveling lane of the autonomous vehicle ahead of the autonomous vehicle (hereinafter, referred to as a "a rear overtaking vehicle" for the sake of convenience), the autonomous vehicle only passively responds through deceleration and yielding, rather than to flexibly respond to such situations.

SUMMARY

The present disclosure is directed to a vehicle running control apparatus and method that substantially obviate one or more problems due to limitations and disadvantages of the related art.

The present disclosure provides a vehicle running control apparatus and method that are capable of predicting the intention of a rear vehicle to overtake an autonomous vehicle in order to perform a cut-in operation and flexibly responding to the current traveling situation.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the present disclosure, as embodied and broadly described herein, a vehicle running control method includes: acquiring, by a sensor, at least one of a first traveling state information of an autonomous vehicle and a second traveling state information of at least one adjacent vehicle traveling in a traveling lane in which the autonomous vehicle is traveling or in a lane adjacent to the traveling lane through; determining, by a determination processor, a candidate cut-in vehicle that travels behind the autonomous vehicle among the at least one adjacent vehicle based on the first traveling state information and the second traveling state information, acquired from the sensor; searching, by a controller, for a potential cut-in space, which is determined based on the relative velocity of a preceding vehicle that is the closest to the autonomous vehicle among the at least one adjacent vehicle and the distance between the preceding vehicle and the autonomous vehicle; and performing, by the controller, a control such that deceleration, acceleration, and velocity maintenance of the autonomous vehicle is performed based on whether the potential cut-in space is present.

The step of determining the candidate cut-in vehicle may include: calculating at least one of the position, the velocity, or the acceleration of each of the autonomous vehicle and the at least one adjacent vehicle based on the first and second traveling state information; comparing the velocity of the autonomous vehicle with the velocity of the at least one adjacent vehicle that travels behind the autonomous vehicle; and determining, based on the result of comparison, that an adjacent vehicle having a velocity higher than the velocity of the autonomous vehicle is the candidate cut-in vehicle.

The step of determining the candidate cut-in vehicle may further include acquiring road environment information through a map storage unit, and the candidate cut-in vehicle may be determined based on the road environment information.

The road environment information may include a stationary obstacle information or a junction information located ahead in the adjacent lane.

Whether the potential cut-in space is present may be determined based on the distance between the autonomous vehicle and the preceding vehicle and the overall length of the candidate cut-in vehicle.

The step of performing control may include: comparing the time desired for the autonomous vehicle to arrive at a front boundary line of the potential cut-in space with the time desired for the candidate cut-in vehicle to arrive at the front boundary line of the potential cut-in space; and performing one of deceleration and acceleration of the autonomous vehicle when the potential cut-in space is searched.

The step of performing control may include: performing deceleration in the case in which a first arrival time of the autonomous vehicle exceeds a second arrival time of the candidate cut-in vehicle; and performing acceleration in the case in which the first arrival time of the autonomous vehicle is equal to or shorter than the second arrival time of the candidate cut-in vehicle.

The step of performing control may include performing one of deceleration, acceleration, and velocity maintenance depending on a predetermined safety distance in the case in which the potential cut-in space is not present, and the predetermined safety distance may include a maximum safety distance and a minimum safety distance, which are set depending on the distance between the autonomous vehicle and a preceding vehicle that is located in the traveling lane, among the at least one adjacent vehicle.

The step of performing control may include: performing acceleration in the case in which the autonomous vehicle does not enter within the maximum safety distance; and performing velocity maintenance in the case in which the autonomous vehicle enters within the minimum safety distance.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

DRAWINGS

The accompanying drawings, which are included to provide a further understanding of the present disclosure and are incorporated in and constitute a part of this application, illustrate exemplary forms of the present disclosure and together with the description serve to explain the principle of the present disclosure.

In order that the disclosure may be well understood, there will now be described various forms thereof, given by way of example, reference being made to the accompanying drawings, in which.

Figure 1:
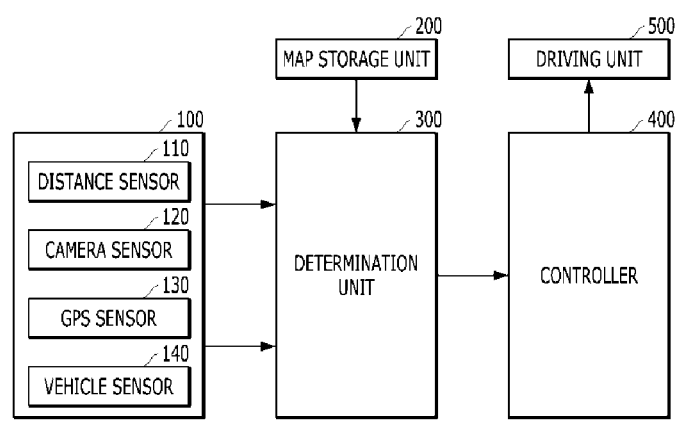
FIG. 1 is a schematic block diagram showing an apparatus for controlling the autonomous running of a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Since the forms of the present disclosure may be variously modified and may have various forms, specific forms will be shown in the drawings and will be described in detail in this specification or this disclosure. However, the forms according to the concept of the present disclosure are not limited by such specific forms, and it should be understood that the present disclosure includes all alterations, equivalents, and substitutes that fall within the idea and technical scope of the present disclosure.

It will be understood that, although the terms "first", "second", etc. may be used herein to describe various elements, the corresponding elements should not be understood to be limited by these terms, which are used only to distinguish one element from another. In addition, the terms particularly defined in consideration of the constructions and operations of the forms are provided to explain the forms, rather than to limit the scope of the forms.

The terms used in this specification are provided only to explain specific forms, but are not intended to restrict the present disclosure. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meaning as commonly understood by a person having ordinary skill in the art to which the present disclosure pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Also, the terms, such as 'unit,' 'controller,' or 'module', etc., should be understood as a unit that processes at least one function or operation and that may be embodied in a hardware manner (e.g., a processor), a software manner, or a combination of the hardware manner and the software manner.

Hereinafter, a vehicle running control apparatus according to the present disclosure will be described with reference to the accompanying drawings.

Figure 2:
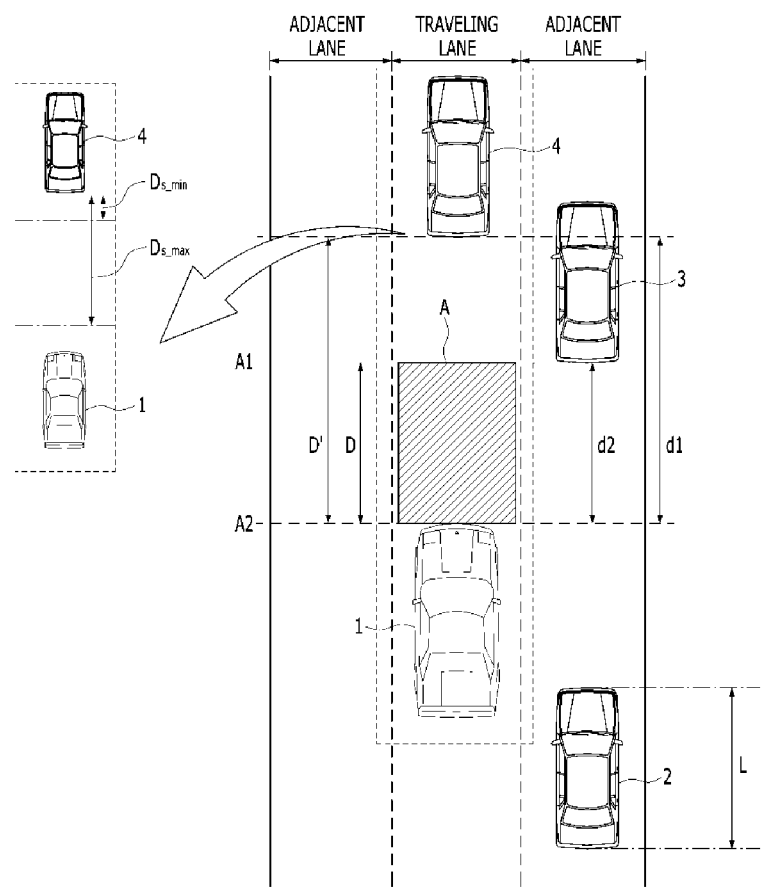
FIG. 2 is a view illustrating the operation of the autonomous running control apparatus shown in FIG. 1.

FIG. 1 is a schematic block diagram showing an apparatus for controlling the autonomous running of a vehicle according to one form of the present disclosure. FIG. 2 is a view illustrating the operation of the autonomous running control apparatus shown in FIG. 1. The running control apparatus will be described hereinafter with reference to FIGS. 1 and 2.

As shown in FIG. 1, the running control apparatus, denoted by reference numeral 10, may include a sensor unit 100, a map storage unit 200, a determination unit 300, a controller 400, and a driving unit 500.

The sensor unit 100 may acquire information about the traveling state of an autonomous vehicle 1 and information about the traveling state of at least one adjacent vehicle 2, 3, and 4 traveling in the traveling lane of the autonomous vehicle 1 and in a lane adjacent to the traveling lane.

The sensor unit 100 may include a distance sensor 110 for acquiring information about the distance between the autonomous vehicle 1 and an object located in the vicinity of the autonomous vehicle 1, a camera sensor 120 for acquiring information about captured images of the surroundings of the autonomous vehicle 1, a GPS sensor 130 for acquiring information about the current position of the autonomous vehicle 1, and a vehicle sensor 140 for acquiring vehicle information, such as the velocity, the acceleration, the yaw rate, and the steering angle of the autonomous vehicle 1.

The distance sensor 110 may be implemented as a LIDAR or RADAR sensor, and may measure the arrival time of a laser pulse or an electromagnetic wave emitted toward each of the adjacent vehicles 2, 3, and 4 in order to calculate the distance between the autonomous vehicle 1 and each of the adjacent vehicles 2, 3, and 4. In addition, the distance sensor 110 may measure the overall length L of each of the adjacent vehicles. Here, the overall length L means the length of each of the adjacent vehicles from the front to the rear thereof.

The camera sensor 120 may acquire information about images of the surroundings of the autonomous vehicle 1 through an image sensor, and may perform image processing, such as noise removal, on the acquired images.

The GPS sensor 130 may measure the current position of the autonomous vehicle 1 using a signal transmitted from a GPS satellite.

The vehicle sensor 140 may include a velocity sensor, an acceleration sensor, and a yaw-rate sensor, and may measure vehicle information, such as the velocity, the acceleration, the yaw rate, and the steering angle of the autonomous vehicle.

The map storage unit 200 may store a high-definition map, from which it is possible to distinguish between vehicle lanes, in the form of a database (DB). The high-definition map may provide information about the environment of the road on which the autonomous vehicle travels (for example, information about a stationary obstacle and information about a junction) and information about a map, and may be automatically and periodically updated using wireless communication or may be manually updated by a user.

The determination unit 300 may calculate the position, the velocity, and the acceleration of each of the adjacent vehicles 2, 3, and 4 based on the traveling state information acquired from the sensor unit 100.

The determination unit 300 may calculate the relative position, the relative velocity, and the relative acceleration of each of the adjacent vehicles 2, 3, and 4 based on at least one of the distance information or the image information from the distance sensor 110 and the camera sensor 120. In addition, the determination unit 300 may calculate the absolute position, the absolute velocity, and the absolute acceleration of each of the adjacent vehicles 2, 3, and 4 in further consideration of at least one of the position information or the vehicle information of the autonomous vehicle 1 received from the GPS sensor 130 and the vehicle sensor 140.

Here, the calculated position, velocity, and acceleration of each of the adjacent vehicles 2, 3, and 4 may be stored in the state of being divided into the lateral component and the longitudinal component thereof, and may be updated every measurement period of the respective sensors 110, 120, 130, and 140.

The determination unit 300 may determine whether a stationary obstacle or a junction is located ahead in a lane adjacent to the traveling lane of the autonomous vehicle 1 based on the map information and the road environment information received from the map storage unit 200.

The determination unit 300 may determine a vehicle expected to cut in the traveling lane (hereinafter, referred to as a "candidate cut-in vehicle" for the sake of convenience) from among the adjacent vehicles 2, 3, and 4 that travel behind the autonomous vehicle based on at least one of the position, the velocity, or the acceleration of each of the adjacent vehicles 2, 3, and 4 and the road environment information.

The determination unit 300 may compare the velocities of the adjacent vehicles that travel behind the autonomous vehicle 1, calculated based on the velocity of the autonomous vehicle 1 acquired through the vehicle sensor 140 and the traveling state information, to determine a candidate cut-in vehicle 2. At this time, the velocity of the candidate cut-in vehicle 2 may exceed the velocity of the autonomous vehicle 1. In other words, an adjacent vehicle that has a higher velocity or a greater acceleration increase rate than the autonomous vehicle 1 from among the adjacent vehicles that travel behind the autonomous vehicle 1 may be determined to be the candidate cut-in vehicle 2.

In addition, the determination unit 300 may determine that a rear vehicle that travels in an adjacent lane in which a stationary obstacle or a junction is located ahead is the candidate cut-in vehicle 2 based on the road environment information, which will be described with reference to FIG. 3.

Figure 3:
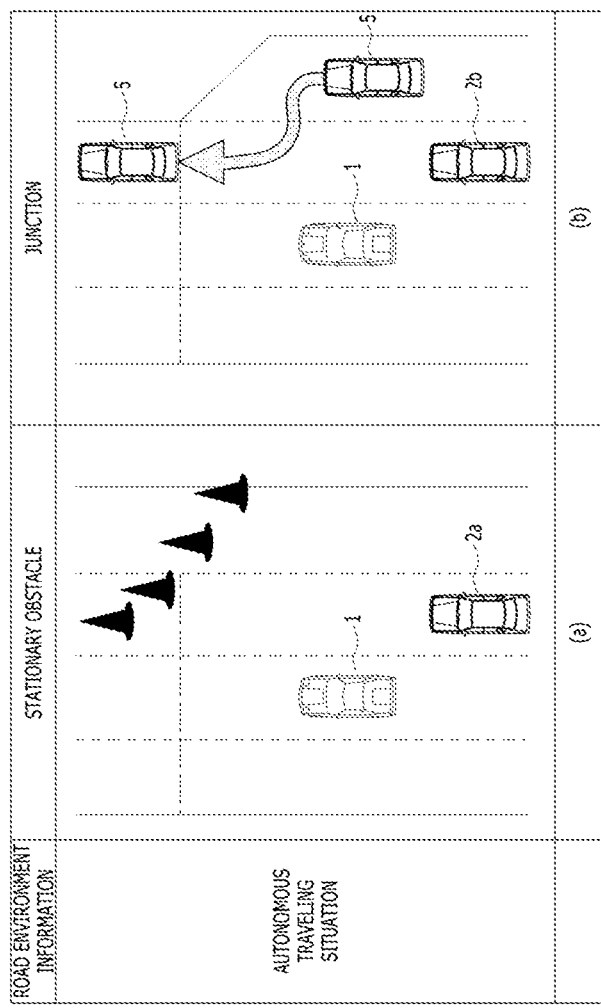
FIG. 3 is a view illustrating the determination of a candidate cut-in vehicle based on road environment information according to one form of the present disclosure.

FIG. 3 is a view illustrating the determination of a candidate cut-in vehicle based on road environment information according to one form of the present disclosure.

As shown in FIG. 3, in the case in which a stationary obstacle or a junction is located ahead in a lane adjacent to the traveling lane of the autonomous vehicle 1, it is desired for an adjacent vehicle 2a or 2b that travels straight in the adjacent lane to enter the traveling lane of the autonomous vehicle 1.

Referring to FIG. 3 (i.e., a view (a) of FIG. 3), in the case in which a stationary obstacle is located ahead of a rear vehicle 2a that travels in a third lane behind the autonomous vehicle 1, it is sufficiently expected for the rear vehicle 2a to attempt to cut in ahead of the autonomous vehicle at the end point of the stationary obstacle.

In addition, referring to FIG. 3 (i.e., another view (b) of FIG. 3), in the case in which a junction is located ahead of a rear vehicle 2b that travels in a third lane behind the autonomous vehicle 1, the rear vehicle 2a may attempt to cut in ahead of the autonomous vehicle due to the entry of a merging vehicle 5 into the junction.

The determination unit 300 may determine that a vehicle expected to cut into the traveling lane of the autonomous vehicle 1 is a candidate cut-in vehicle 2a or 2b in consideration of the road environment information requiring the lane change.

Referring back to FIGS. 1 and 2, the determination unit 300 may determine the candidate cut-in vehicle 2, and may calculate predetermined data as a pre-processing procedure for controlling the driving of the autonomous vehicle 1. Here, the predetermined data may include the longitudinal distance between the autonomous vehicle 1 and at least one adjacent vehicle 2, 3, and 4 and the arrival time.

The controller 400 may search for a potential cut-in space A, which is determined based on the relative velocity of the preceding vehicle 3, which is the closest to the autonomous vehicle 1 among the adjacent vehicles 2, 3, and 4, and the distance between the preceding vehicle 3 and the autonomous vehicle 1, and may perform control such that the velocity of the autonomous vehicle 1 is decreased, increased, or maintained depending on whether the potential cut-in space A is present.

The controller 400 may determine whether the potential cut-in space A is present based on the distance D between the autonomous vehicle 1 and the preceding vehicle 3 and the overall length L of the candidate cut-in vehicle 2. Upon determining that the distance D is equal to or larger than the overall length L of the candidate cut-in vehicle 2 as the result of the comparison between the distance D and the overall length L of the candidate cut-in vehicle 2, the controller 400 may determine that the potential cut-in space A is present.

Here, the potential cut-in space A may be defined by a front boundary line A1 extending from the rear surface of the preceding vehicle 3 in the direction perpendicular to the traveling direction of the autonomous vehicle 1 and a rear boundary line A2 extending from the front surface of the autonomous vehicle 1 in the direction perpendicular to the traveling direction of the autonomous vehicle 1.

In the case in which the potential cut-in space A is present, the controller 400 may compare the time desired for the autonomous vehicle 1 to arrive at the front boundary line A1 of the potential cut-in space A with the time desired for the candidate cut-in vehicle 2 to arrive at the front boundary line A1 of the potential cut-in space A, and may perform deceleration or acceleration.

In the case in which a first arrival time desired for the autonomous vehicle 1 to arrive at the front boundary line A1 of the potential cut-in space A exceeds a second arrival time desired for the candidate cut-in vehicle 2 to arrive at the front boundary line A1 of the potential cut-in space A, the controller 400 may perform control to decelerate the autonomous vehicle 1, and may yield in order to allow the entry of the candidate cut-in vehicle 2.

In the case in which the first arrival time of the autonomous vehicle 1 is shorter than the second arrival time of the candidate cut-in vehicle 2, the controller 400 may perform control to accelerate the autonomous vehicle 1, whereby it is possible to remove the potential cut-in space A of the candidate cut-in vehicle 2 and to improve the continuity of travel of the autonomous vehicle 1.

Meanwhile, in the case in which the potential cut-in space A is not present, the controller 400 may perform deceleration, acceleration, or velocity maintenance in consideration of a predetermined safety distance $D_s$. The predetermined safety distance $D_s$ may be set depending on the distance between the autonomous vehicle 1 and the preceding vehicle 4, which is located in the traveling lane of the autonomous vehicle 1, among the adjacent vehicles 2, 3, and 4, and may include the maximum safety distance and the minimum safety distance. Here, the maximum safety distance $D_{s\_max}$ may be defined as the maximum distance within the range within which the potential cut-in space is not allowed in the relationship between the autonomous vehicle 1 and the candidate cut-in vehicle 2, and the minimum safety distance $D_{s\_min}$ may be defined as the minimum distance within the range within which a collision is avoidable in the relationship between the autonomous vehicle 1 and the preceding vehicle 4.

In the case in which the autonomous vehicle 1 does not enter within the maximum safety distance $D_{s\_max}$, the controller 400 may perform control to accelerate the autonomous vehicle 1 such that the distance between the autonomous vehicle 1 and the preceding vehicle 4 is decreased. This is desired to remove the potential cut-in space A of the candidate cut-in vehicle 2 and to improve the continuity of travel of the autonomous vehicle 1.

In the case in which the autonomous vehicle 1 enters within the minimum safety distance $D_{s\_min}$, the controller may perform control to maintain the velocity of the autonomous vehicle 1. The reason for this is that a space into which the candidate cut-in vehicle 2 enters is not present between the autonomous vehicle 1 and the preceding vehicle 4, whereby it is not necessary to change the velocity of the autonomous vehicle 1.

Meanwhile, in the case in which the candidate cut-in vehicle 2 is determined, the determination unit 300 may transmit a trigger signal to the controller 400, and the controller 400 may perform a predetermined operation in response to the trigger signal. Upon receiving no trigger signal from the determination unit 300, the controller 400 may perform control to maintain the velocity of the autonomous vehicle 1.

When performing control to accelerate the autonomous vehicle 1, the controller 400 may transmit a warning signal to the candidate cut-in vehicle 2 through inter-vehicle communication (V2X; Vehicle to Everything). The controller 400 may transmit the warning signal to the candidate cut-in vehicle such that the candidate cut-in vehicle 2 responds to the acceleration of the autonomous vehicle 1.

The driving unit 500 is configured to drive the autonomous vehicle 1 in response to the driving control signal from the controller 400, and may include components for actually driving the vehicle, such as a brake, an accelerator, a transmission, and a steering device. For example, in the case in which the control signal from the controller 400 is a signal indicating acceleration, the accelerator of the driving unit 500 may perform an acceleration operation.

As described above, the vehicle running control apparatus is capable of flexibly responding to the traveling conditions, whereby it is possible to prevent the flow of traffic from being hindered due to indiscriminate deceleration or yielding and to reduce the discomfort of drivers and passengers in adjacent vehicles.

Hereinafter, a vehicle running control method for flexibly responding to various traveling situations will be described with reference to FIGS. 4 and 5.

Figure 4:
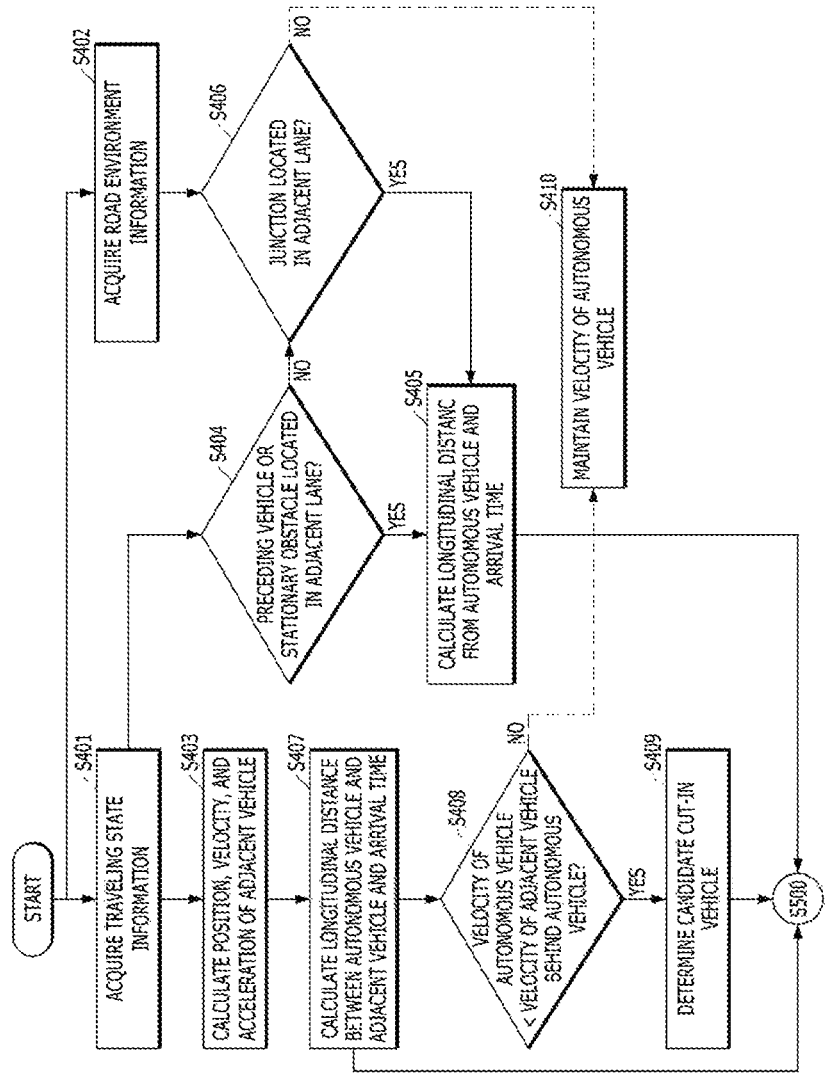
FIG. 4 is a flowchart illustrating a vehicle running control method according to one form of the present disclosure.

FIG. 4 is a flowchart illustrating a vehicle running control method according to an exemplary form of the present disclosure.

Referring to FIG. 4, the determination unit 300 may acquire information about a first traveling state of the autonomous vehicle 1 and information about a second traveling state of at least one adjacent vehicle 2, 3, and 4 traveling in the traveling lane of the autonomous vehicle 1 and in a lane adjacent to the traveling lane through the sensor unit 100 (S401).

Subsequently, the determination unit 300 may acquire road environment information through the map storage unit 200 (S402).

The determination unit 300 may calculate the position, the velocity, and the acceleration of each of the adjacent vehicles 2, 3, and 4 based on the first and second traveling state information, acquired at step S401 (S403). Here, the calculated position, velocity, and acceleration of each of the adjacent vehicles 2, 3, and 4 may be stored in the state of being divided into the lateral component and the longitudinal component thereof, and may be updated every measurement period of the respective sensors 110, 120, 130, and 140.

After step S403, the determination unit 300 may determine whether the preceding vehicle 3 or a stationary obstacle is located ahead in a lane adjacent to the traveling lane of the autonomous vehicle 1 based on the traveling state information (S404).

Upon determining that the preceding vehicle 3 or a stationary obstacle is located ahead in the adjacent lane (YES in S404), the determination unit 300 may calculate the longitudinal distance between the autonomous vehicle 1 and the preceding vehicle 3 or the stationary obstacle and the arrival time (S405).

Upon determining that the preceding vehicle 3 or a stationary obstacle is not located ahead in the adjacent lane (NO in S404), the determination unit 300 may determine whether a junction is located ahead in the adjacent lane based on the road environment information, acquired at step S402 (S406). Upon determining that a junction is located ahead in the adjacent lane (YES in S406), the determination unit 300 may calculate the longitudinal distance between the autonomous vehicle 1 and the junction and the arrival time (S405).

Meanwhile, in the case in which no junction is located ahead in the adjacent lane, the controller 400 may perform control to maintain the velocity of the autonomous vehicle 1. In other words, in the case in which none of the preceding vehicle 3, a stationary obstacle, or a junction is located ahead in the adjacent lane, the determination unit 300 may determine whether the possibility that the vehicle 2 that travels behind the autonomous vehicle 1 will cut in is low, and the controller 400 may not perform control to change the velocity of the autonomous vehicle 1.

The determination unit 300 may calculate the longitudinal distance between the autonomous vehicle 1 and the at least one adjacent vehicles 2, 3, and 4 and the arrival time as a pre-processing procedure for controlling the driving of the autonomous vehicle 1 based on the position, the velocity, and the acceleration of each of the adjacent vehicles 2, 3, and 4, calculated at step S403, and may transmit the same to step S500 (S407).

Subsequently, the determination unit 300 may compare the velocity of the autonomous vehicle 1, acquired through the vehicle sensor 140, with the velocity of each of the adjacent vehicles that travels behind the autonomous vehicle 1, calculated based on the traveling state information (S408), and may determine a candidate cut-in vehicle 2 (S409).

In the case in which the velocity of the autonomous vehicle 1 is equal to or lower than the velocity of each of the adjacent vehicles that travels behind the autonomous vehicle (NO in S408), the controller 400 may perform control to maintain the velocity of the autonomous vehicle 1 (S410). The reason for this is that, if the relative velocity of each of the adjacent vehicles that travel behind the autonomous vehicle is 0 or lower, it is difficult to consider that each of the adjacent vehicles has the intention to overtake the autonomous vehicle 1 and thus to perform the cut-in operation.

Meanwhile, in the case in which there is an adjacent vehicle that has a higher velocity or a greater acceleration increase rate than the autonomous vehicle 1 among the adjacent vehicles that travel behind the autonomous vehicle 1 (YES in S408), the determination unit 300 may determine that the adjacent vehicle is a candidate cut-in vehicle (S409).

In the case in which the candidate cut-in vehicle is determined at step S409, the determination unit 300 may transmit a trigger signal for activating driving control to the controller 400, and the controller 400 may perform a predetermined operation in response to the trigger signal (S500). Hereinafter, the predetermined operation of the controller 400 will be described in detail with reference to FIG. 5.

Figure 5:
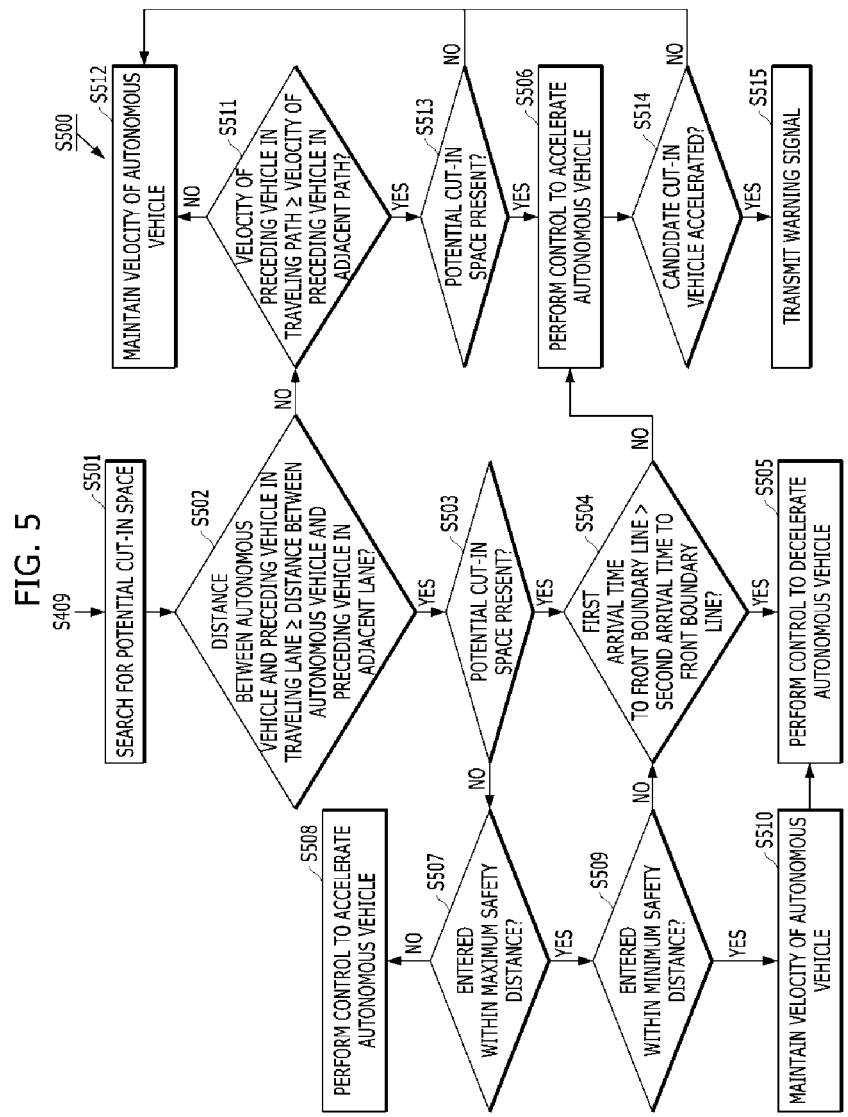
FIG. 5 is a flowchart showing step S500 of FIG. 4 in detail.

FIG. 5 is a flowchart showing step S500 of FIG. 4 in detail.

Upon receiving the trigger signal from the determination unit 300, the controller 400 may search for a potential cut-in space (S501).

In order to search for the potential cut-in space, the controller 400 may search for the preceding vehicle that is the closest to the autonomous vehicle 1 among the adjacent vehicles 2, 3, and 4. For example, the controller 400 may compare a first distance d1 between the autonomous vehicle 1 and the preceding vehicle 4 located ahead in the traveling lane with a second distance d2 between the autonomous vehicle 1 and the preceding vehicle 3 located ahead in the adjacent lane (S502).

In the case in which the first distance d1 is equal to or greater than second distance d2, the controller 400 sets the preceding vehicle 3 located ahead in the adjacent lane as the adjacent vehicle that is the closest to the autonomous vehicle 1, and determines whether a potential cut-in space is present.

The controller 400 may determine whether a potential cut-in space A is present based on the distance D between the autonomous vehicle 1 and the preceding vehicle 3 and the overall length L of the candidate cut-in vehicle 2 (S503).

Upon determining that the distance D is equal to or larger than the overall length L of the candidate cut-in vehicle (YES in S503) as the result of the comparison between the distance D and the overall length L of the candidate cut-in vehicle 2, the controller 400 may determine that the potential cut-in space A is present, and may compare the time desired for the autonomous vehicle 1 to arrive at the front boundary line A1 of the potential cut-in space A with the time desired for the candidate cut-in vehicle 2 to arrive at the front boundary line A1 of the potential cut-in space A (S504).

In the case in which a first arrival time desired for the autonomous vehicle 1 to arrive at the front boundary line A1 of the potential cut-in space A exceeds a second arrival time desired for the candidate cut-in vehicle 2 to arrive at the front boundary line A1 of the potential cut-in space A as the result of comparison (YES in S504), the controller 400 may perform control to decelerate the autonomous vehicle 1 (S505).

In the case in which the first arrival time of the autonomous vehicle 1 is shorter than the second arrival time of the candidate cut-in vehicle 2 (NO in S504), the controller 400 may perform control to accelerate the autonomous vehicle 1 (S506).

Meanwhile, in the case in which no potential cut-in space A is present (NO in S503), the controller 400 may perform deceleration, acceleration, or velocity maintenance in consideration of a predetermined safety distance $D_s$. The predetermined safety distance $D_s$ may include the maximum safety distance $D_{s\_max}$, which is the maximum distance within the range within which the potential cut-in space is not allowed in the relationship between the autonomous vehicle 1 and the candidate cut-in vehicle 2, and the minimum safety distance $D_{s\_min}$, which is the minimum distance within the range within which a collision is avoidable in the relationship between the autonomous vehicle 1 and the preceding vehicle 4.

In the case in which the autonomous vehicle 1 does not enter within the maximum safety distance $D_{s\_max}$ (NO in S507), the controller 400 may perform control to accelerate the autonomous vehicle 1 (S508).

In the case in which the autonomous vehicle 1 enters between the maximum safety distance $D_{s\_max}$ and the minimum safety distance $D_{s\_min}$ (YES in S507 and NO in S509), the procedure may return to step S504.

In the case in which the autonomous vehicle 1 enters within the minimum safety distance $D_{s\_min}$, the controller 400 may perform control to maintain the velocity of the autonomous vehicle 1 (S510).

Meanwhile, in the case in which the first distance d1 is smaller than the second distance d2 at step S502, the controller 400 may set the preceding vehicle 4 located ahead in the traveling path as the adjacent vehicle that is the closest to the autonomous vehicle 1 (NO in S502), and may compare the velocity of the preceding vehicle 4 located in the traveling path with the velocity of the preceding vehicle 3 located in the adjacent path (S511).

In the case in which the velocity of the preceding vehicle 4 located in the traveling path is lower than the velocity of the preceding vehicle 3 located in the adjacent path (NO in S511), the controller 400 may perform control to maintain the velocity of the autonomous vehicle 1 (S512).

In the case in which the velocity of the preceding vehicle 4 located in the traveling path is equal to or higher than the velocity of the preceding vehicle 3 located in the adjacent path (YES in S511), the controller 400 may determine whether the potential cut-in space A is present based on the distance D' between the autonomous vehicle 1 and the preceding vehicle 4 and the overall length L of the candidate cut-in vehicle 2 (S513).

In the case in which the distance D' is equal to or larger than the overall length L of the candidate cut-in vehicle (YES in S513), the controller 400 may determine that the potential cut-in space A is present, and may perform control to accelerate the autonomous vehicle 1 (S506).

In the case in which the distance D' is smaller than the overall length L of the candidate cut-in vehicle 2 (NO in S513), the controller 400 may determine that no potential cut-in space A is present, and may perform control to maintain the velocity of the autonomous vehicle 1 (S512).

Meanwhile, when performing control to accelerate the autonomous vehicle 1 (S506), the controller 400 may determine whether the candidate cut-in vehicle 2 is accelerated (S514), and may transmit a warning signal to the candidate cut-in vehicle 2 through inter-vehicle communication (V2X; Vehicle to Everything) (S515). In the case in which the velocity of the candidate cut-in vehicle 2 is not changed (NO in S514), the controller 400 may perform control to maintain the velocity of the autonomous vehicle 1 without transmitting a warning signal.

The vehicle running control method according to the form of the present disclosure described above may be implemented as a program that can be executed by a computer and stored in a computer-readable recording medium. Examples of the computer-readable recording medium include ROM, RAM, CD-ROM, magnetic tape, a floppy disk, and an optical data storage device.

The computer-readable recording medium may be distributed to a computer system connected over a network, and computer-readable code may be stored and executed thereon in a distributed manner. Functional programs, code, and code segments for implementing the method described above may be easily inferred by programmers in the art to which at least one form pertains.

Although only a few forms have been described above, various other forms may be provided. The above forms may be combined in various manners unless they are incompatible, and new forms may be realized therethrough.

As is apparent from the above description, according to at least one form of the present disclosure, it is possible to predict the intention of a rear vehicle to overtake an autonomous vehicle in order to perform a cut-in operation and to perform deceleration, acceleration, or velocity maintenance in response to the traveling conditions.

Consequently, it is possible to prevent the flow of traffic from being hindered due to indiscriminate deceleration or yielding in an autonomous traveling situation and to reduce the discomfort of drivers and passengers in adjacent vehicles.

It will be appreciated by those skilled in the art that the effects achievable through the present disclosure are not limited to what have been particularly described hereinabove and that other effects of the present disclosure will be more clearly understood from the above detailed description.

It will be apparent to those skilled in the art that various modifications and variations can be made in the present disclosure without departing from the spirit or scope of the present disclosure. Consequently, the above detailed description is not to be construed as limiting the present disclosure in any aspect, and is to be considered by way of example. The scope of the present disclosure should be determined by reasonable interpretation of the accompanying claims, and all equivalent modifications made without departing from the scope of the present disclosure should be understood to be included in the scope of the following claims.

What is claimed is:

1. A vehicle running control method, comprising:
   acquiring, by a sensor, at least one of a first traveling state information of an autonomous vehicle or a second traveling state information of at least one adjacent vehicle traveling in a traveling lane in which the autonomous vehicle is traveling or in a lane adjacent to the traveling lane through;
   determining, by a determination processor, a candidate cut-in vehicle that travels behind the autonomous vehicle among the at least one adjacent vehicle based on the first traveling state information and the second traveling state information, acquired from the sensor;
   searching, by a controller, for a potential cut-in space, which is determined based on a relative velocity of a preceding vehicle that is closest to the autonomous vehicle among the at least one adjacent vehicle and a distance between the preceding vehicle and the autonomous vehicle; and
   performing, by the controller, a control such that deceleration, acceleration, and velocity maintenance of the autonomous vehicle is performed based on whether the potential cut-in space is present,
   wherein performing the control comprises:
      comparing a time for the autonomous vehicle to arrive at a front boundary line of the potential cut-in space with a time for the candidate cut-in vehicle to arrive at the front boundary line of the potential cut-in space;
      performing deceleration when a first arrival time of the autonomous vehicle exceeds a second arrival time of the candidate cut-in vehicle; and
      performing acceleration when the first arrival time of the autonomous vehicle is equal to or shorter than the second arrival time of the candidate cut-in vehicle.

2. The vehicle running control method according to claim 1, wherein determining the candidate cut-in vehicle comprises:
   calculating at least one of a position, a velocity, or an acceleration of each of the autonomous vehicle and the at least one adjacent vehicle based on the first and second traveling state information;
   comparing the velocity of the autonomous vehicle with the velocity of the at least one adjacent vehicle that travels behind the autonomous vehicle; and
   determining, based on a result of the comparison, that an adjacent vehicle having a velocity higher than the velocity of the autonomous vehicle is the candidate cut-in vehicle.

3. The vehicle running control method according to claim 2, wherein determining the candidate cut-in vehicle further comprises acquiring road environment information through a map storage unit, and
   wherein the candidate cut-in vehicle is determined based on the road environment information.

4. The vehicle running control method according to claim 3, wherein the road environment information comprises a stationary obstacle information or a junction information located ahead in the adjacent lane.

5. The vehicle running control method according to claim 1, wherein whether the potential cut-in space is present is determined based on a distance between the autonomous vehicle and the preceding vehicle, and an overall length of the candidate cut-in vehicle.

6. The vehicle running control method according to claim 1, wherein performing the control comprises: performing the deceleration, the acceleration, and the velocity maintenance based on a predetermined safety distance when the potential cut-in space is not present, wherein the predetermined safety distance comprises a maximum safety distance and a minimum safety distance, which are set based on a distance between the autonomous vehicle and a preceding vehicle that is located in the traveling lane, among the at least one adjacent vehicle.

7. The vehicle running control method according to claim 6, wherein performing the control further comprises:

performing the acceleration when the autonomous vehicle does not enter within the maximum safety distance; and performing the velocity maintenance when the autonomous vehicle enters within the minimum safety distance.

8. A non-transitory computer-readable recording medium containing a program for performing the vehicle running control method according to claim 1.

9. A vehicle running control apparatus, comprising:

a sensor configured to acquire, at least one of a first traveling state information of an autonomous vehicle or a second traveling state information of at least one adjacent vehicle traveling in a traveling lane in which the autonomous vehicle is traveling or in a lane adjacent to the traveling lane;

a determination processor configured to determine a candidate cut-in vehicle that travels behind the autonomous vehicle among the at least one adjacent vehicle based on the first traveling state information and the second traveling state information, acquired from the sensor; and a controller configured to:

search a potential cut-in space, which is determined based on a relative velocity of a preceding vehicle that is the closest to the autonomous vehicle among the at least one adjacent vehicle and a distance between the preceding vehicle and the autonomous vehicle, perform a control such that one of deceleration, acceleration, and velocity maintenance of the autonomous vehicle is performed based on whether the potential cut-in space is present, compare a time for the autonomous vehicle to arrive at a front boundary line of the potential cut-in space with a time for the candidate cut-in vehicle to arrive at the front boundary line of the potential cut-in space, perform deceleration when a first arrival time of the autonomous vehicle exceeds a second arrival time of the candidate cut-in vehicle, and perform acceleration when the first arrival time of the autonomous vehicle is equal to or shorter than the second arrival time of the candidate cut-in vehicle.

10. The vehicle running control apparatus according to claim 9, wherein the determination processor is configured to:

calculate at least one of a position, a velocity, or an acceleration of each of the autonomous vehicle and the at least one adjacent vehicle based on the first and second traveling state information;

compare the calculated velocity of the autonomous vehicle with the calculated velocity of the adjacent vehicle that travels behind the autonomous vehicle; and determine that an adjacent vehicle having a velocity higher than the velocity of the autonomous vehicle is the candidate cut-in vehicle.

11. The vehicle running control apparatus according to claim 10, wherein the determination processor is configured to determine the candidate cut-in vehicle based on road environment information acquired through a map storage unit.

12. The vehicle running control apparatus according to claim 11, wherein the road environment information comprises: a stationary obstacle information, and a junction information located ahead in the adjacent lane.

13. The vehicle running control apparatus according to claim 9, wherein whether the potential cut-in space is present is determined based on a distance between the autonomous vehicle and the preceding vehicle, and an overall length of the candidate cut-in vehicle.

14. The vehicle running control apparatus according to claim 9, wherein the controller is configured to perform the deceleration, the acceleration, and the velocity maintenance based on a predetermined safety distance when the potential cut-in space is not present, and wherein the predetermined safety distance comprises a maximum safety distance and a minimum safety distance, which are set depending on a distance between the autonomous vehicle and a preceding vehicle that is located in the traveling lane among the at least one adjacent vehicle.

15. The vehicle running control apparatus according to claim 14, wherein the controller is configured to:

perform acceleration when the autonomous vehicle does not enter within the maximum safety distance; and perform velocity maintenance when the autonomous vehicle enters within the minimum safety distance.

16. The vehicle running control apparatus according to claim 9, wherein the controller is configured to transmit a warning signal to the candidate cut-in vehicle when control is performed to accelerate the autonomous vehicle.

* * * * *